(12) United States Patent
King

(10) Patent No.: US 12,462,324 B2
(45) Date of Patent: *Nov. 4, 2025

(54) MULTICORE STATE CACHING IN GRAPHICS PROCESSING

(71) Applicant: Imagination Technologies Limited, Kings Langley (GB)

(72) Inventor: Ian King, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 250 days.

This patent is subject to a terminal disclaimer.

(21) Appl. No.: 18/127,554

(22) Filed: Mar. 28, 2023

(65) Prior Publication Data
US 2023/0377088 A1 Nov. 23, 2023

(30) Foreign Application Priority Data

Mar. 30, 2022 (GB) ........................... 2204508
Mar. 30, 2022 (GB) ........................... 2204510

(51) Int. Cl.
*G06T 1/20* (2006.01)
*G06F 9/48* (2006.01)
*G06F 15/80* (2006.01)

(52) U.S. Cl.
CPC .............. *G06T 1/20* (2013.01); *G06F 9/4881* (2013.01); *G06F 15/80* (2013.01)

(58) Field of Classification Search
CPC . G06T 1/20; G06T 1/60; G06F 9/4881; G06F 9/505; G06F 9/5066; G06F 9/544; G06F 15/80

(Continued)

(56) References Cited

U.S. PATENT DOCUMENTS 8,074,224 B1 12/2011 Nordquist et al.
8,330,766 B1 12/2012 McAllister et al.
(Continued)

FOREIGN PATENT DOCUMENTS

CN 105261066 A 1/2016
CN 109978751 A 7/2019
(Continued)

OTHER PUBLICATIONS

Anonymous; "Graphics—SGX543MP4"; Retrieved from the Internet: URL:https://www.psdevwiki.com/vita/Graphics; Sep. 13, 2020; pp. 1-9.

(Continued)

*Primary Examiner* — Jacinta M Crawford
(74) *Attorney, Agent, or Firm* — Potomac Law Group, PLLC; Vincent M DeLuca

(57) ABSTRACT

A set of image rendering tasks and state information are distributed in a graphics processing unit (GPU) having a plurality of cores. A first master unit in one of the cores receives the set of image rendering tasks and the state information, and stores the state information in a memory. The first master unit splits the set of image rendering tasks into a first subset of tasks and a second subset of tasks, wherein the first subset of tasks is assigned to the first core, and the second subset of tasks is assigned to the second core. At least a first portion of the state information is transmitted to the first core, and at least a second portion of the state information is transmitted to the second core. The first subset of tasks is transmitted to the first core, and the second subset of tasks is transmitted to the second core.

20 Claims, 6 Drawing Sheets

(58) Field of Classification Search
USPC .......................................................... 345/504
See application file for complete search history.

(56) References Cited

U.S. PATENT DOCUMENTS

| | | | |
|---|---|---|---|
| 10,275,851 | B1 | 4/2019 | Zhao et al. |
| 10,733,695 | B2 | 8/2020 | Andersson et al. |
| 2007/0091099 | A1 | 4/2007 | Zhang et al. |
| 2009/0307464 | A1* | 12/2009 | Steinberg ................ G06F 9/505 |
| | | | 712/31 |
| 2011/0109638 | A1 | 5/2011 | Duluk, Jr. et al. |
| 2015/0254102 | A1 | 9/2015 | Ueda et al. |
| 2016/0260249 | A1 | 9/2016 | Persson et al. |
| 2017/0178401 | A1 | 6/2017 | Agrawal et al. |
| 2017/0236244 | A1* | 8/2017 | Price .................... G06F 9/5066 |
| | | | 345/504 |
| 2018/0130253 | A1 | 5/2018 | Hazel |
| 2018/0211435 | A1 | 7/2018 | Nijasure et al. |
| 2018/0276876 | A1 | 9/2018 | Yang et al. |
| 2018/0307490 | A1 | 10/2018 | Hakura et al. |
| 2019/0355084 | A1 | 11/2019 | Gierach et al. |
| 2020/0097293 | A1 | 3/2020 | Havlir et al. |
| 2021/0097013 | A1 | 4/2021 | Saleh et al. |
| 2021/0158598 | A1 | 5/2021 | Bratt et al. |
| 2021/0241416 | A1 | 8/2021 | Cerny |
| 2022/0083384 | A1 | 3/2022 | Cerny |
| 2022/0319089 | A1 | 10/2022 | Nemlekar et al. |
| 2024/0005444 | A1 | 1/2024 | Stepuch |
| 2024/0070962 | A1 | 2/2024 | Yang et al. |
| 2024/0127524 | A1 | 4/2024 | Yang et al. |

FOREIGN PATENT DOCUMENTS

| | | |
|---|---|---|
| CN | 112862661 A | 5/2021 |
| EP | 1287494 A1 | 3/2003 |
| EP | 2548171 A1 | 1/2013 |
| EP | 3547248 A1 | 10/2019 |
| EP | 3796263 A1 | 3/2021 |
| EP | 3862975 A1 | 8/2021 |
| GB | 2547252 A | 8/2017 |
| GB | 2594764 A | 11/2021 |
| WO | 2009/068895 A1 | 6/2009 |
| WO | 2018/114957 A1 | 6/2018 |

OTHER PUBLICATIONS

Beets; "A look at the PowerVR graphics architecture: Tilebased rendering"; Retrieved from the Internet: URL:https://blog.imaginationtech.com/a-look-at-the-powervr-graphics-architecture-tile-based-rendering/; Apr. 2, 2015; pp. 1-12.

Beets; "A look at the PowerVR graphics architecture"; Retrieved from the Internet: URL:https://blog.imaginationtech.com/the-dr-in-tbdr-deferred-rendering-in-rogue/; Jan. 28, 2016; pp. 1-13.

Beets; "Introducing Furian: the architectural changes"; Retrieved from the Internet: URL:https://blog.imaginationtech.com/introducing-furian-the-architectural-changes/; Mar. 13, 2017; pp. 1-13.

Yu et al; "A Credit-Based Load-Balance-Aware CTA Scheduling Optimization Scheme in GPGPU"; International Journal of Parallel Programming; vol. 44; No. 1; Aug. 22, 2014; 21 pages.

Fedorov, D.G.: "A new hierarchical parallelization scheme: generalized distributed data interface (GDDI), and an application to the fragment molecular orbital method (FMO)", Journal of computational chemistry. Apr. 30, 2004;25 (6):872-80.

Ullman, S.: "Object recognition and segmentation by a fragment-based hierarchy", Trends in cognitive sciences. Feb. 1, 2007; 11 (2):58-64.

Crisu et al; "Low-Power Techniques and 2D/3D Graphics Architectures"; Report Delft University of Technology; vol. Jan. 2001; Jun. 26, 2001; 139 pages.

Ma; "Concepts and metrics for measurement and prediction of the execution time of GPU rendering commands"; Retrieved from the Internet: URL:https://elib.uni-stuttgart.de/bitstream/11682/3467/1/MSTR_3635.pdf; Aug. 19, 2014; pp. 1-99.

Nickolls et al; "Appendix C: Graphics and Computing GPU'S"; Computer Organization and Design: The Hardware/Software Interface; URL:http://booksite.elsevier.com/9780124077263/downloads/advance_contents_and_appendices/appendix_C.pdf ; Jan. 1, 2013; 82 pages.

Imagination Technologies: "Tiling positive or how Vulkan maps to PowerVR GPUs"; Retrieved from the Internet: URL: https%3A%2F%2Fblog.imaginationtech.com%2Ftiling-positive-or-how-vulkan-maps-to-powervr-gpus%2F; Mar. 9, 2016; pp. 1-13.

Kayhan; "Chasing Triangles in a Tile-based Rasterizer"; Retrieved from the Internet: URL:https://tayfunkayhan.wordpress.com/2019/07/26/chasing-triangles-in-a-tile-based•-rasterizer/; Jul. 29, 2019; pp. 1-18.

* cited by examiner

MULTICORE STATE CACHING IN GRAPHICS PROCESSING

CLAIM OF PRIORITY AND CROSS-REFERENCE TO RELATED APPLICATIONS

This application claims foreign priority under 35 U.S.C. 119 from United Kingdom patent application Nos. GB 2204508.2 and GB 2204510.8, each filed on 30 Mar. 2022, which are herein incorporated by reference in their entirety. This application is also related to application Ser. No. 18/126,332 filed Mar. 24, 2023, now U.S. Pat. No. 11,900,503, and application Ser. No. 18/439,730 filed Feb. 12, 2024, now U.S. Pat. No. 12,315,032.

BACKGROUND

In computer graphics, "rendering" is the process of converting a 3D model, describing a virtual scene, into one or more 2D images, representing a view of the scene from a specific viewpoint (or viewpoints). As this is a computationally intensive process, for typical virtual scenes, it is common to provide a hardware accelerator that is specialised in carrying out the necessary computations. This kind of hardware accelerator is known in the art as a graphics processing unit (GPU).

Different GPUs may have different hardware architectures, reflecting different strategies for carrying out the computations necessary for 3D rendering. One exemplary GPU uses a "tile-based deferred rendering" pipeline.

This approach separates the rendering process into two distinct stages. One of these two stages—the geometry processing stage (or simply geometry stage, for short)—involves processing geometry data that describes the 3-D model of the scene. The geometry data is transformed from the 3-D space into the 2-D coordinates of the image, based on the particular viewpoint to be rendered. The output of this stage is transformed geometry, which is stored in a "parameter buffer".

The fundamental operation in the geometry stage is to work out what primitive shapes fall within each tile. The primitives are most commonly triangles. These triangles join together to form objects. The triangles are described in terms of their vertices (corner points). Each vertex includes positional information (the location of the vertex) and can include additional information, for example, colour. The vertex information is stored in a vertex buffer. The location of each vertex in the buffer is its index number. In other words, the indices are pointers to the respective vertices. A list of the indices is stored in an index buffer. Two associated vertices (or indices) form a line primitive. Associating three vertices (or indices) forms a triangle primitive. It is generally more efficient to work with the indices instead of the vertices when creating primitives, as the indices are smaller (in memory).

The geometry stage of a rendering operation begins when the GPU receives a draw call from an application driver. The draw call contains instructions for geometry processing tasks (in particular, what triangles to draw) and all of the information needed to carry out the geometry processing. The draw call includes the base address of the index buffer. The indices contained in the index buffer in turn point to the vertices in the vertex buffer. The draw call also defines additional information needed to interpret the indices—such as topology information. The topology defines how the indices are to be interpreted—for example, whether they define individual triangles, three vertices at a time, or a "strip" of triangles, in which each index adds a new triangle to the end of the strip.

It should be understood that geometry processing tasks are not the only type of task involved in image rendering. Examples of other types of tasks include compute tasks and fragment tasks. Collectively, these tasks are referred to as image rendering tasks. In order to reduce rendering time, it is desirable to process image rendering tasks in parallel using a multicore GPU.

SUMMARY

As mentioned above, a set of geometry processing tasks is normally provided to the GPU in a draw call. More generally, sets of image rendering tasks may be provided to the GPU by an application driver, or may be triggered internally by the GPU. Normally, each set of image rendering tasks consists solely of one type of task. For example, a set of image rendering tasks may consist solely of geometry processing tasks. In order to process the set of geometry processing tasks (for example) in parallel, the set of geometry processing tasks contained within the draw call must be split into smaller groups of tasks that can be processed on each core of the multicore system. In one exemplary solution according to a comparative example, a central hub is responsible for splitting the draw call into groups of tasks and assigning those tasks to the cores of the multicore system. Each core in the multicore system is directly connected to the central hub by a dedicated communications link. The central hub provides the cores with instructions over these dedicated links, giving the cores tasks to process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A multicore graphics processing unit (GPU) and a method of operating a GPU are provided. The GPU comprises at least a first core and a second core. At least one of the cores in the multicore GPU comprises a master unit configured to distribute image rendering tasks and state information between at least the first core and the second core.

According to one aspect, there is provided a graphics processing unit comprising a plurality of cores, wherein one of the plurality of cores comprises a first master unit configured to:
  receive a set of image rendering tasks and state information, wherein the state information comprises elements of state information required for processing the image rendering tasks;
  store the state information in a memory;
  split the set of image rendering tasks into at least a first subset of tasks and a second subset of tasks;
  assign the first subset of tasks to a first core of the plurality of cores;
  assign the second subset of tasks to a second core of the plurality of cores;
  transmit an indication of at least a first portion of the state information to the first core;
  transmit an indication of at least a second portion of the state information to the second core;
  transmit an indication of the first subset of tasks to the first core;
  transmit an indication of the second subset of tasks to the second core); and wherein each core of the plurality of cores comprises a slave unit configured to perform image rendering tasks.

The first master unit may send the state information only to the first core and the second core (and not to any other cores of the plurality). Where the GPU comprises more than two cores, the first master unit may be configured to select at least two cores of the plurality of cores to execute the image rendering tasks. The master unit might only assign subsets of tasks to the cores it has selected. The first master unit might only send state information to a core to which it has assigned a subset of tasks. In particular, the plurality of cores may include a third core that is not selected to perform the image rendering tasks, and the first master unit may be configured not to send state information to the third core.

In some examples, one of the first and second cores may comprise the first master unit. In other examples, another core, such as the third core, may comprise the first master unit.

In order to process an image rendering task, a core requires one or more elements of state information that tell it how to perform the task. For example, the task may comprise tessellation. In order to carry out the tessellation, the core requires tessellator state information that tells it which tessellator program to use. Similarly, if a task involves shading then the core requires shader state information that tells it which shader program to use. By sending the state information only to the cores to which subsets of tasks have been assigned, unnecessary transmissions between cores can be avoided.

The first master unit may be configured to: identify first elements of the state information that are required for processing the first subset of tasks; and identify second elements of the state information that are required for processing the second subset of tasks, wherein the first portion of the of the state information consists of the first elements of the state information, and the second portion of the state information consists of the second elements of the state information.

The first elements of state information and the second elements of state information may overlap. That is, some elements of state information may be identified as both first elements and second elements. The first and second elements of state information may be identical, in that they every first element is also a second element, and vice versa. Alternatively, the first and second elements of state information might not be identical, in that they might not share all of their elements. At least some of the first elements may be different to the second elements, and/or at least some of the second elements may be different to the first elements. In other words, the first elements of state information may comprise different elements of state information than the second elements of state information. In some examples, there may be no overlap between the subsets. That is, the first subset and the second subset may have no elements of state information in common.

Referring specifically to the state information, the first master unit may transmit to the first core only the first elements of the state information, and transmit to the second core only the second elements of state information. In other words, the first master unit may transmit to the first core only the elements of state information that are required to process the first subset of tasks, and may transmit to the second core only the elements of state information that are required to process the second subset of tasks.

In this way, in order to further reduce unnecessary transmissions of information between the cores, each core might only be sent the state information that it needs to process the subset of tasks it has been assigned. In an example, the first subset of tasks comprises first vertex shading tasks but does not comprise geometry shading tasks, and the second subset of tasks comprises geometry shading tasks and second vertex shading tasks (the second vertex shading tasks being different to the first vertex shading tasks). Accordingly, the first master unit will send to the first core the elements of state information relating to the first vertex shading tasks (first vertex shader state) but will not send the elements relating to geometry shading (the geometry shader state) or the second vertex shading tasks (second vertex shader state). The first master unit will send to the second core the geometry shader state and second vertex shader state, but will not send the first vertex shader state.

Examples of elements of state information include: a draw state; an index buffer location; a vertex shader; a hull shader; a domain shader; a geometry shader; a uniform shader; index buffer topology information; and a tessellator state.

By only transmitting to a core the elements of state information required to process the image rendering tasks assigned to that core, the total amount of data being transmitted between cores can be reduced.

The first master unit may be configured to not transmit to the first core any elements of state information other than the first elements of state information; and to not transmit the second core any elements of state information other than the second elements of state information.

In other words, the first master unit might only transmit state information to the first core if that information was identified as a first element of state information, and might only transmit to the second core state information if that information was identified as a second element of state information.

In some examples, this rule may be adapted in that the first master unit may be configured to identify cumulative elements of state information as being required to process any/every subset of image rendering tasks. This means that cumulative elements of state information might always be identified as being first/second elements of state information, and, therefore, a core that has been assigned a subset of tasks may be provided with the cumulative elements of state information (even where the cumulative elements of state information are not in actuality required to process that subset of tasks).

In some examples, particularly in examples in which the GPU comprises one or more cores that are not assigned a subset of tasks, the first master unit may nonetheless be configured to transmit the cumulative elements of state information to those one or more cores. In other words, the first master unit may be configured to transmit the cumulative elements of state information to each core of the plurality of cores.

The first master unit may be configured to maintain a record of the cores to which each element of state information has been transmitted, and to update the record each time an element of state information is transmitted to one of the cores.

For example, the first master unit can store a table listing various elements of state information and for each core store a bit indicating whether the state has been transmitted to the core or not. This enables the first master unit to continuously keep track of which cores have received the various elements of state information.

The first master unit may be configured to: receive additional state information, wherein the additional state information comprises one or more of:

(A)—a new element of state information, wherein the master unit is configured to:
  store the new element of state information; and
  update the record to include the new element of state information and indicate that the new element has not been transmitted to any of the cores; or
(B)—an updated element of state information, wherein the master unit is configured to:
  replace an element of state information stored in the memory with the updated element of state information; and
  update the record to indicate that the updated element has not been transmitted to any of the cores,
receive an additional set of image rendering tasks associated with the additional state information;
split the additional set of image rendering tasks into at least a third subset of tasks and a fourth subset of tasks;
assign the third subset of tasks to the first core;
identify, based on the record, third elements of state information, wherein the third elements of state information are elements of state information that are required to process the third subset of tasks and have not been transmitted to the first core; transmit, to the first core, an indication of the third elements of state information; and transmit an indication of the third subset of tasks to the first core.

For example, the index buffer topology information may be updated for a new set of tasks which refer to a different index buffer. The previously stored topology state information can be replaced (for example, by being overwritten) by the new topology state information, and the record of cores to which the topology state information has been transmitted can be cleared. The first master unit will transmit the new topology state information to the first core because, having inspected the record, the master unit can determine that the first core has not yet received the topology state information (even if the first core had received the old topology state information).

The first master unit might only transmit to the first core the third elements of state information. By this it is meant that the only state information transmitted to the first core in connection with the third subset of tasks may be the third elements of state information. It should be remembered that, in some examples, the first master unit is configured to identify cumulative elements of state information as being required to process any/every image rendering task, and so the third elements may include new cumulative elements of state information.

The state information may include a cumulative element of state information, and the first master unit may be configured to transmit the cumulative element of state information to every core in the graphics processing unit.

Cumulative elements of state information, like geometry state information, are elements that are updated by adding/appending additional information to older information instead of replacing the older information. For this reason, over the course of the rendering of a scene cumulative elements state information can become much larger than other elements of state information due to multiple state information updates. The first master unit may be configured to identify cumulative elements of state information as being relevant to every/any subset of tasks.

The first master unit may be configured to receive a new cumulative element of state information and transmit the new cumulative element to each of the plurality of cores.

If, at some point during the rendering of the scene, a core requires the cumulative elements to execute a subset of tasks assigned to it, and the first master unit is not configured to transmit cumulative elements of state information the cores of the GPU, then the first master unit would need to have stored all of the cumulative elements, and would have to transmit all of those elements to the core. This could consume large amounts of time and bandwidth, and delay other important communications between the cores. By transmitting the new cumulative element to all of the cores each time a new element is received, only a small amount of information needs to be transmitted to each core at any given time.

One of the plurality of cores may comprise a second master unit. The second master unit may be configured to: receive a second set of image rendering tasks and second state information, wherein the second state information comprises elements of second state information required for processing the second set of image rendering tasks; store the second state information in a second memory; split the second set of image rendering tasks into at least a fifth subset of tasks and a sixth subset of tasks; assign the fifth subset of tasks to the first core; transmit an indication of at least a portion of the second state information to the first core; and transmit the fifth subset of tasks to the first core.

The second set of image rendering tasks may consist of a different type of task than the first set. For example, the first set may consist of fragment processing tasks and the second set may consist of geometry processing tasks. The first and second state information might not share any information, meaning that no information found in the first state information is also found in the second state information. In this way, the management of different types of image rendering task may be segregated, with one master unit only ever interacting with one type of task and that task's state information.

The second master unit may maintain a record of which elements of the second state information have been transmitted to each of the cores in the same way as the first master unit.

The first core may be the core comprising the first and/or second master unit. Alternatively, the second core may be the core comprising the first and/or second master unit. Another core, distinct from both the first and second cores may comprise the first and/or second master unit. The core that comprises the first master unit may also comprise the second master unit.

The second master unit may function in the same way as the first master unit. Any method step or feature described for the first master unit may be applied to the second master unit, and more generally to any master unit in the GPU.

The plurality of cores may be connected by a register bus configured to communicate register write commands between the cores. The first master unit may be configured to output at least a first register write command and a second register write command, wherein the first register write command is addressed to the first core and comprises an indication of the elements of state information required to process the first subset of tasks; and the second register write command is addressed to the second core and comprises an indication of the elements of state information required to process the second subset of tasks.

The first master unit may output the register write commands directly to the register bus, or may output them to another hardware unit in the core in which the first master unit resides and that interfaces with the register bus. It should be understood that when the master unit resides within a particular core, the master unit may transmit internally any indications that are addressed to the core in which it resides. By "transmit internally", it is meant that the indication is not transmitted via the register bus, and is instead transmitted across the links that allow communication between the hardware components within the core. In other words, when the master unit transmits an indication to a core in which it does not reside, the master unit may transmit that indication via the register bus. However, when the master unit transmits an indication to the core in which it resides, it might not transmit that indication over the register bus, and may instead transmit the indications to another hardware unit within the core, such as to the slave unit of that core.

The first register write command may contain an indication of the address of the elements of state information required to process the first subset of tasks in the memory. The second register write command may contain an indication of the address of the elements of state information required to process the second subset of tasks in the memory. The indication of the elements of state information may comprise the elements of state information. The first master unit may also transmit the indications of the first and second subsets of tasks as register write commands.

The first core may comprise a plurality of processing units configured to process image rendering tasks. The slave unit of the first core may be configured to: receive the first subset of the image rendering tasks and the first portion of the state information; split the first subset of image rendering tasks into a seventh subset of tasks and an eighth subset of tasks; send the seventh subset to a first processing unit; send the eighth subset to a second processing unit; forward the first portion of the state information to the first processing unit; and forward the first portion of the state information to the second processing unit.

The second core may also comprise one or more processing units, and at least one slave unit. The slave unit of the second core can split subsets of tasks assigned to it in the same way as described above for the first core. The number of processing units in the first and second cores may be the same.

Unlike the first master unit, which only transmits an element of state information to the cores that require that element to process a task, the slave unit of the first core may forward the first elements of state information to all of its processing units. The first master unit and the slave unit may operate in these different ways because the connections between a slave unit and its processing units may be dedicated connections, meaning that there is no competition for use of the connection and consequently no need to try to reduce the amount of data sent to each core In contrast, the cores of the GPU may be linked by a register bus configured to carry register write commands. The register bus may only be able to carry a single communication at a time, and to a single recipient core. Consequently, there may be a large amount of competition for use of the register bus, incentivising a reduction in the amount of data that is sent to each core.

Also provided is a method of distributing a set of image rendering tasks and state information in a graphics processing unit comprising a plurality of cores, the method comprising: receiving, by a first master unit in one of the plurality of cores, the set of image rendering tasks and the state information, wherein the state information comprises elements of state information required for processing the image rendering tasks; storing, by the first master unit, the state information in a memory; splitting, by the first master unit, the set of image rendering tasks into at least a first subset of tasks and a second subset of tasks; assigning, by the master unit, the first subset of tasks to the first core; assigning, by the master unit, the second subset of tasks to the second core; transmitting, by the master unit to the first core, at least a first portion of the state information; transmitting, by the master unit to the second core; at least a second portion of the state information; transmitting, by the master unit to the first core, the first subset of tasks; and transmitting, by the master unit to the second core, the second subset of tasks.

The first master unit assigns the subsets to the cores before it transmits the relevant state information to the cores. The first master unit may transmit the first subset of tasks to the first core before or after it transmits to the first core at least the elements of state information required to process the first subset of tasks. Similarly, the first master unit may transmit the second subset of tasks to the second core before or after it transmits to the second core at least the elements of state information required to process the second subset of tasks.

The method may further comprise: identifying, by the first master unit, first elements of state information that are required for processing the first subset of tasks; and identifying, by the first master unit, second elements of state information that are required for processing the second subset of tasks. The first portion of the state information may consist of the first elements of the state information, and the second portion of the state information may consist of the second elements of the state information.

The master unit might not transmit to the first core any elements of state information other than the first elements of state information; and might not transmit to the second core, any elements of state information other than the second elements of state information.

The method may further comprise maintaining, by the first master unit, a record of the cores to which each element of state information has been transmitted; and updating, by the first master unit, the record each time an element of state information is transmitted to one of the cores.

The method may further comprise:
receiving, by the first master unit, additional state information, wherein the additional state information comprises one or more of:
(A)—a new element of state information, wherein the method further comprises:
storing, by the master unit, the new element of state information; and
updating, by the master unit, the record to include the new element of state information and indicate that the new element has not been transmitted to any of the cores; or
(B)—an updated element of state information, wherein the method further comprises:
replacing, by the master unit, an element of state information stored in the memory with the updated element of state information; and
updating, by the master unit, the record to indicate that the updated element has not been transmitted to any of the cores,
receiving (314B), by the first master unit, an additional set of image rendering tasks associated with the additional state information;
splitting, by the first master unit, the additional set of image rendering tasks into at least a third subset of tasks and a fourth subset of tasks;
assigning, by the first master unit, the third subset of tasks to the first core;
identifying, based on the record, third elements of state information, wherein the third elements of state information are elements of state information that are required to process the third subset of tasks and have not been transmitted to the first core;

transmitting, by the first master unit and to the first core, an indication of the third elements of state information; and transmitting, by the first master unit, an indication of the third subset of tasks to the first core.

The state information may include a cumulative element of state information, and the method may further comprise transmitting, by the first master unit, the cumulative element of state information to every core in the graphics processing unit.

The method may further comprise receiving, by the first master unit, a new cumulative element of state information; and transmitting, by the first master unit, the new cumulative element of state information to each core in the plurality of cores.

The method may further comprise: receiving, by a slave unit of the first core, the first subset of tasks and the first portion of the state information; splitting, by the slave unit, the first subset of tasks into a fifth subset of tasks and a sixth subset of tasks; sending, by the slave unit; the fifth subset of tasks to a first processing unit of the first core; sending, by the slave unit; the sixth subset of tasks to a second processing unit of the first core; forwarding, by the slave unit to the first processing unit, the first portion of the state information; and forwarding, by the slave unit to the second processing unit, the first portion of the state information.

The method may further comprise: receiving, by a second master unit in one of the plurality of cores, a second set of image rendering tasks and second state information, wherein the second state information comprises elements of second state information required for processing the second set of image rendering tasks; storing, by the second master unit, the second state information in a second memory; splitting, by the second master unit, the second set of image rendering tasks into at least a seventh subset of tasks and an eighth subset of tasks; assigning, by the second master unit, the seventh subset of tasks to the first core; transmitting, by the second master unit to the first core, at least a portion of the second state information; and transmitting, by the second master unit, the seventh subset of tasks to the first core.

One of the first and second cores may comprise the second master unit. The core comprising the second master unit may the same core as the core comprising the first master unit, or a different core.

The second state information may be managed by the second master unit in the same way that the first master unit manages the state information. The second master unit may assign the eighth subset of tasks to the first core, to the second core, or to any other of the plurality of cores.

Also provided is a graphics processing system comprising a GPU as summarised above; and a graphics processing system configured to perform a method as summarised above. The graphics processing system may be embodied in hardware on an integrated circuit.

Also provided is a method of manufacturing, using an integrated circuit manufacturing system, a graphics processing system or GPU as summarised above. The method may comprise processing, using a layout processing system, a computer readable description of the graphics processing system or GPU so as to generate a circuit layout description of an integrated circuit embodying the graphics processing system; and manufacturing, using an integrated circuit generation system, the graphics processing system or GPU according to the circuit layout description.

Also provided is computer readable code configured to cause a method as summarized above to be performed when the code is run; and a computer readable storage medium having encoded thereon said computer readable code. The computer readable storage medium may be a non-transitory computer readable storage medium.

Also provided is an integrated circuit definition dataset that, when processed in an integrated circuit manufacturing system, configures the integrated circuit manufacturing system to manufacture a graphics processing system or GPU as summarized above.

Also provided is a computer readable storage medium (optionally non-transitory) having stored thereon a computer readable description of a graphics processing system or GPU as summarised above that, when processed in an integrated circuit manufacturing system, causes the integrated circuit manufacturing system to manufacture an integrated circuit embodying the graphics processing system or GPU.

Also provided is a computer readable storage medium (optionally non-transitory) having stored thereon a computer readable description of a graphics processing system or GPU as summarised above that, when processed in an integrated circuit manufacturing system, causes the integrated circuit manufacturing system to: process, using a layout processing system, the computer readable description of the graphics processing system or GPU so as to generate a circuit layout description of an integrated circuit embodying the graphics processing system or GPU; and manufacture, using an integrated circuit generation system, the graphics processing system or GPU according to the circuit layout description.

Also provided is an integrated circuit manufacturing system configured to manufacture a graphics processing system or GPU as summarised above. The integrated circuit manufacturing system may comprise: a computer readable storage medium (optionally non-transitory) having stored thereon a computer readable description of a graphics processing system or GPU as summarised above; a layout processing system configured to process the computer readable description so as to generate a circuit layout description of an integrated circuit embodying the graphics processing system or GPU; and an integrated circuit generation system configured to manufacture the graphics processing system or GPU according to the circuit layout description.

The GPU may be embodied in hardware on an integrated circuit. There may be provided a method of manufacturing, at an integrated circuit manufacturing system, a GPU. There may be provided an integrated circuit definition dataset that, when processed in an integrated circuit manufacturing system, configures the system to manufacture a GPU or graphics processing system. There may be provided a non-transitory computer readable storage medium having stored thereon a computer readable description of a GPU or graphics processing system that, when processed in an integrated circuit manufacturing system, causes the integrated circuit manufacturing system to manufacture an integrated circuit embodying a GPU or graphics processing system.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
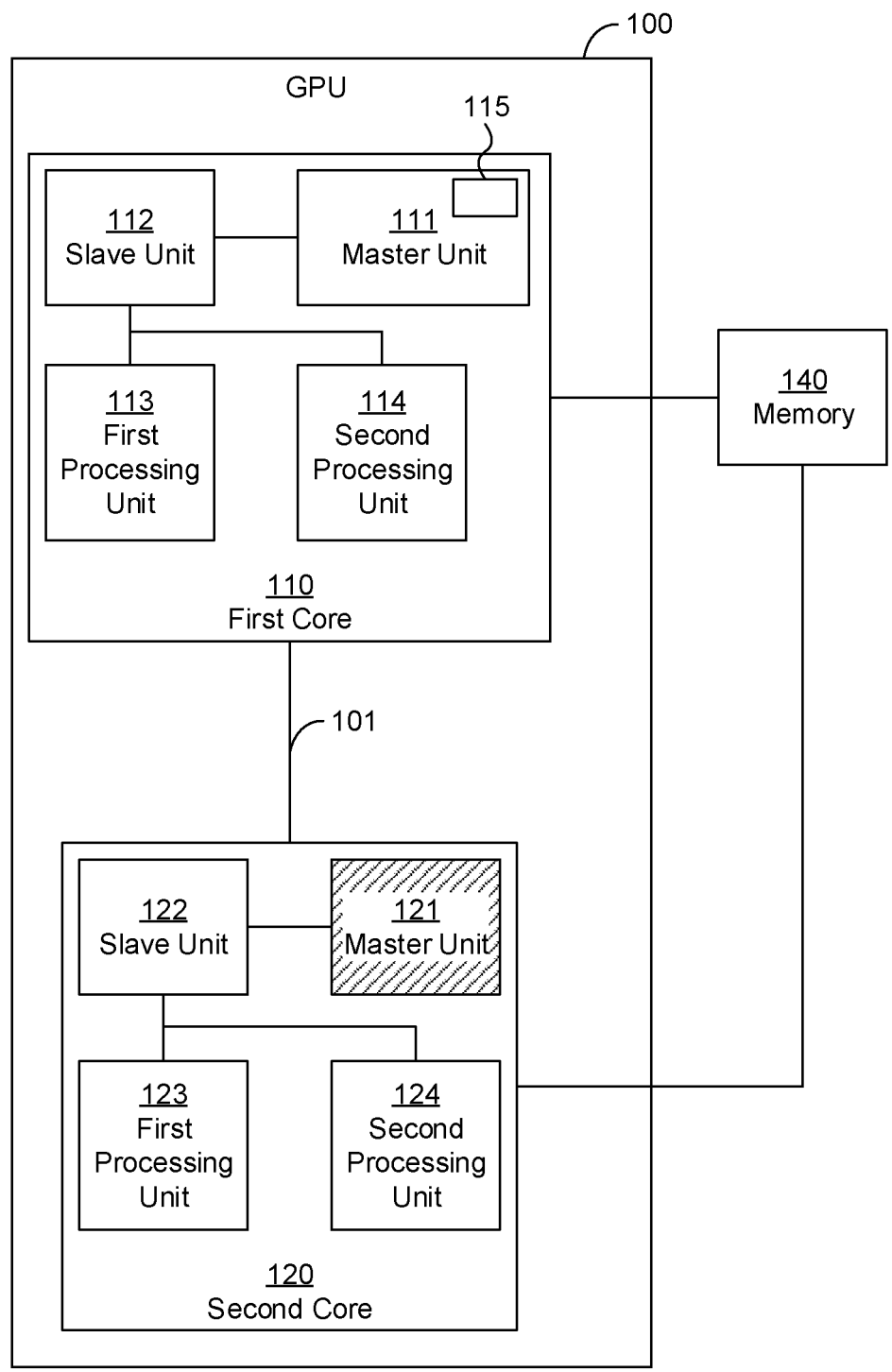
FIG. 1 is a block diagram of a GPU according to an example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As mentioned above, a draw call includes instructions for geometry processing tasks and the information required to process those tasks. The information required to process a set of tasks will be referred to herein as state information. A draw call may contain multiple different elements of state information. Some elements of state information may be relevant to all of the tasks of the draw call, in that these elements of state information are required to process any/all of the tasks. Other elements of state information may be relevant to only a subset of the tasks. It should be remembered that geometry processing tasks are simply one example of image rendering tasks, and that other types of image rendering tasks are also provided with state information.

We now return to the comparative example of the central hub. In some possible implementations of the central hub, after having received a draw call, the central hub may transmit all of the state information contained within the draw call to each the cores in the GPU. This ensures that each core is able to execute any of the geometry processing tasks contained within the draw call. However, as mentioned above, only some of the elements of state information are required to process any given geometry processing task. It is possible that the central hub will split the geometry processing tasks such that at least one core never needs some elements of the state information. In fact, some of the cores might not be sent geometry processing tasks to execute. In other words, in some examples the transmission of certain elements of state information to a core is redundant.

The central hub system has a number of drawbacks. One of these is that the dedicated communications link between the central hub and each of the cores occupies chip space without directly contributing to the processing of image rendering tasks. One solution to this problem is to replace the dedicated connections with a communications link that connects all of the cores together. It may be particularly beneficial to exploit an already present communications link, such as a register bus/XPU bus. Additionally, the central hub itself may also be removed, and its functions assumed by one of the cores of GPU.

Because each core of the central hub system is linked to the central hub by a dedicated communications link, there is no competition between the cores for communication with the central hub. However, when exploiting communications links like a register bus, competition for use of the register bus can arise. In an example, the cores of the GPU are connected by a register bus, which is used to carry state information, and instructions for processing image rendering tasks, to the cores. In this example, the register bus may only be able to carry a single communication addressed to a single address at any one time. For example, when the register bus is carrying an indication of a set of image rendering tasks or state information to a core in the GPU, the register bus is unable to carry any other communications to any other address. This includes indications of image rendering tasks that are addressed to other cores in the GPU, as well as standard register read and write commands carried by the register bus. In other words, the cores of the GPU are in competition for use of the register bus. This competition may lead to cores becoming idle, because the core that has responsibility for sending the instructions and state information is waiting for access to the bus. This can reduce the overall performance of the GPU.

It would be desirable to reduce the redundant transmission of state information. This would help to reduce (unnecessary) competition for use of the bus and thereby make the system more efficient overall.

In the following description, the terms "first", "second", "third", etc. are used to describe various elements of a GPU and a method. These terms are labels only, and do not imply a particular ordering or hierarchy of importance between the elements, unless explicitly stated otherwise.

Examples will now be described with reference to the drawings.

An example according to the present disclosure provides a GPU. The GPU comprises a plurality of cores. At least one of the plurality of cores comprises a master unit configured to receive image rendering tasks and state information from an application driver or from another hardware unit within the GPU, and to distribute said image rendering tasks and state information between at least a first and a second core.

An exemplary GPU is depicted in FIG. 1. The GPU 100 comprises a first core 110 and a second core 120. The first core 110 comprises a master unit 111, a slave unit 112, a first processing unit 113 and a second processing unit 114. The slave unit 112 is in communication with the master unit 111 and the two processing units 113, 114. The master unit 111 comprises a cache 115. The second core 120 comprises a master unit 121, a slave unit 122, a first processing unit 123 and a second processing unit 124. The slave unit 122 is in communication with the master unit 121 and the two processing units 123, 124. The processing units are configured to process the image rendering tasks. In other examples, each core might contain only a single processing unit, or more than two processing units. In some examples, the slave unit(s) of each core may comprise the one or more processing units, or other hardware configured to process image rendering tasks.

The first and second cores 110, 120 are connected by a register bus 101, and are in communication with one another such that information can be sent between the cores 110, 120 via the register bus 101. This information includes indications of image rendering tasks, and indications of state information. The first core 110 and the second core 120 are in communication with a memory 140.

In the present example, only the master unit 111 of the first core is active. The master unit 121 of the second core is inactive, as indicated by the hatching of this unit in FIG. 1. The master unit 111 of the first core 110 is referred to herein as the active master unit. In the present example, the active master unit 111 is a geometry master unit, which means that it is configured to receive a set of geometry processing tasks, and state information required to execute the geometry processing tasks, from an application driver. In this example, the state information includes the following elements: a draw state; an index buffer location; a vertex shader; a hull shader; a domain shader; a geometry shader; a uniform shader; geometry state and index buffer topology information. It should be understood that in other examples the state information may include only some of these elements of state information, and/or may include other elements not listed above.

The active master unit 111 is configured to cache (store) the state information in the cache 115, and to create and maintain a record of which elements of state information have been transmitted to each core. The active master unit 111 is configured to transmit an indication of any cumulative elements of state information to each core of the GPU 100. More specifically, the active master unit 111 is configured to transmit the cumulative elements of state information to the slave unit 112 of the first core 110, and to the slave unit 122 of the second core 120. A cumulative element of state information is one that is updated by adding additional information to the existing state information, rather than replacing an element of state information. In the present example, the geometry state is cumulative.

The active master unit 111 is configured to split the incoming geometry processing tasks into subsets of tasks, as necessary, and to assign the subsets to particular cores 110, 120. In the present example, the active master unit 111 splits the set of geometry processing tasks into a first subset of tasks and a second subset of tasks. The active master unit 111 assigns the first subset of geometry processing tasks to the first core 110, and assigns the second subset of geometry processing tasks to the second core 120. In examples in which the GPU 100 comprises more than two cores, the active master unit 111 may select at least two cores to execute the geometry processing tasks, and only assign subsets of tasks to the cores selected.

The active master unit 111 is configured to identify the elements of state information that are required to process each subset of tasks, and to transmit an indication of the relevant state information to the core to which the subset of tasks is assigned. In the present example, the active master unit 111 identifies the elements of state information that are required to process the first subset of tasks, referred to herein as the first elements of state information. The active master unit 111 transmits an indication of the first elements of state information to the first core 110. More specifically, in the example of FIG. 1 the active master unit 111 transmits the first elements of state information to the slave unit 112 of the first core 110 internally within the first core 110. The active master unit 111 also identifies the elements of state information that are required to process the second subset of tasks, referred to herein as the second elements of state information. The active master unit 111 transmits an indication of the second elements of state information to the second core 120. In the present example, the active master unit 111 transmits the second elements of state information to the slave unit 122 of the second core 120 over the register bus 101. The active master unit 111 is configured to transmit to each respective core only the elements of state information that are required for the respective core to process its subset of tasks. In the present example, the active master unit 111 transmits to the first core 110 only the elements of state information that are required to process the first subset of tasks. The active master unit 111 also transmits to the second core 120 only the elements of state information that are required to process the second subset of tasks. In other words, the active master unit 111 is configured to transmit to the first core 110 only the elements of state information identified as first elements, and to transmit to the second core 120 only the elements of state information identified as second elements. In this way, the unnecessary transmission of information between the cores may be reduced.

The active master unit 111 is configured to transmit an indication of the subset of tasks assigned to a core to that particular core. In the present example, the active master unit 111 transmits an indication of the first subset of tasks to the first core 110, and transmits an indication of the second subset of tasks to the second core 120.

By "transmit an indication", it is meant that that the active master unit 111 transmits either: the data in question; or information that enables the receiving core to obtain the required data. As mentioned above, the active master unit 111 transmits an indication of the first subset of tasks to the first core. In the present example this indication is the address in the memory 140 of the first subset of tasks. (In other examples, a different indication can be used.) Using this information, the first core 110 can then retrieve from the memory 140 the data to be processed in the execution of the first subset of tasks. In the present example, the active master unit 111 transmits elements of state information to the cores, rather than transmitting memory addresses of elements of state information (or another kind of indication). In other examples, the active master unit 111 may transmit to the cores the addresses in memory of required elements of state information, and/or may transmit to the cores the subsets of tasks (rather than transmitting the memory addresses of the subsets of tasks). In still other examples, the active master unit 111 may transmit to the cores the addresses in memory of some types of elements of state information, whilst for other types of elements of state information the active master unit 111 may transmit the elements of state information themselves.

The active master unit 111 is configured to update the record each time the active master unit 111 transmits elements of state information to a core. In this way, the record can accurately indicate to which core each element of state information has been transmitted.

The active master unit 111 is configured to receive additional state information from the application driver, as well as an additional set of geometry processing tasks. In the present example, the additional state information includes a new element of state information—tessellator state information, and an updated element of state information—updated topology information.

The active master unit 111 is configured to store the tessellator state information in the cache 115. The active master unit 111 is configured to update the record to include the tessellator state information and to indicate that the tessellator state information has not been transmitted to any of the cores.

The active master unit 111 is configured to replace the topology information stored in the cache 115 with the updated topology information (for example, by overwriting the topology information stored in the cache 115 with the updated topology information), and update the record to indicate that the topology information has not been transmitted to any of the cores.

The active master unit 111 is configured to split the additional set of tasks into (further) subsets of tasks, as necessary, and to assign the subsets to particular cores 110, 120. In the present example, the active master unit 111 splits the additional set of tasks into a third subset and a fourth subset of tasks, and assigns the third subset to the first core 110. The active master unit 111 is configured to identify the elements of state information, including the additional state information, that are required to process each (further) subset of tasks, and that have not already been transmitted to the core to which the subset of tasks has been assigned, as indicated by the record. In the present example, the active master unit 111 identifies the elements of state information, including the additional state information, that are required to process the third subset of tasks and that have not already been transmitted to the first core 110, as indicated by the record. These required elements of state information are referred to as third elements of state information, and the active master unit 111 is configured to transmit an indication of the third elements to the first core 110.

The active master unit 111 is configured to receive a new cumulative element of state information from the application driver. The active master unit 111 is configured to transmit an indication of the new cumulative element of state information to each of the cores in the GPU 100. In this way, it is ensured that all of the cores always have up-to-date cumulative state information. It is preferable to manage cumulative state information in this way because, over the course of an image rendering operation, cumulative elements of state information can grow to consume substantial amounts of memory. If the cumulative element of state information needed to be transmitted to a core in its entirety at a late stage in the image rendering operation, it could block the register bus 101 for a considerable length of time.

The role of a slave unit in a core is to manage the execution of image rendering tasks assigned to that core by a master unit. Normally, a slave unit will manage the execution of a single type of image rendering task. In the present example, this means managing the execution of geometry processing tasks. The slave unit 112 of the first core 110 is configured to receive the indication of the first subset of tasks and the first elements of state information transmitted to the first core 110 by the active master unit 111. The slave unit 112 is configured to assign its received tasks amongst the processing units 113, 114 in the first core 110, and to send the tasks to their assigned processing units 113, 114 accordingly. In the present example, the slave unit 112 splits the first subset of tasks into two further subsets of tasks, which will be referred to as a fifth subset of tasks and a sixth subset of tasks. The slave unit 112 assigns the fifth subset of tasks to the first processing unit 113 and assigns the sixth subset of tasks to the second processing unit 114. The slave unit 112 sends the fifth subset of tasks to the first processing unit 113 and sends the sixth subset of tasks to the second processing unit 114. In this way, the processing units of the core 110 can be used to process tasks in parallel. In contrast to the active master unit 111, the slave unit 112 is configured to send the first elements of state information to both the first and second processing units 113, 114, even if each of the processing units only requires a subset of the first elements of state information to perform its respective subset of tasks. It may be beneficial for the slave unit 112 to operate in this way because the slave unit 112 and the processing unit 113, 114 are linked by dedicated connections. There is no competition for use of these dedicated connections, therefore there is little benefit to spending the time and computational resources required to identify and send to the processing units only the elements of state information that they require to process their subsets of tasks. Rather, it is faster to simply send all of the state information to each of the processing units.

In the example of FIG. 1, only one master unit in the GPU 100 is active. One active master unit is able to distribute one type of image rendering task between the cores of a GPU. Examples of types of image rendering tasks include geometry processing tasks, fragment processing tasks and compute tasks. In FIG. 1, for simplicity only the components used to process one type of image rendering task (geometry processing tasks) are shown, and therefore there is only one active master unit (a geometry master unit) shown explicitly in the drawing. However, it should be understood that a GPU will normally be configured to process more than one type of image rendering task, and therefore will include additional components used to process other types of image rendering tasks (for example, where the GPU is configured to process compute tasks, the GPU will comprise compute master units and compute slave units). In some examples, the first and second cores 110, 120 may contain these additional components. In some examples, the additional components may form part of other core(s) not shown in FIG. 1.

An example GPU may comprise one active master unit for each type of image rendering task that the GPU is configured to process. In an example in which the GPU is configured to process geometry processing tasks, compute tasks and fragment tasks, the GPU comprises an active geometry master unit, an active compute master unit and an active fragment master unit. The active master units may all reside in the same core, or they may reside in different cores. In some examples, a core may comprise some, but not all, of the active master units.

Similarly, for each type of image rendering task that the GPU is configured to process, each core of the GPU may comprise one slave unit configured to process that type of image rendering task, such that each core is able to process any type of image rendering task. Continuing the example in which the GPU is configured to process geometry processing tasks, compute tasks and fragment processing tasks, each core comprises a geometry slave unit, a compute slave unit and a fragment slave unit. To simplify design, development, and testing, the cores of the GPU are preferably all identical. This means that each core may comprise the same set of master units, slave units and processing units (even though only one of the master units of each type will be active).

Figure 2:
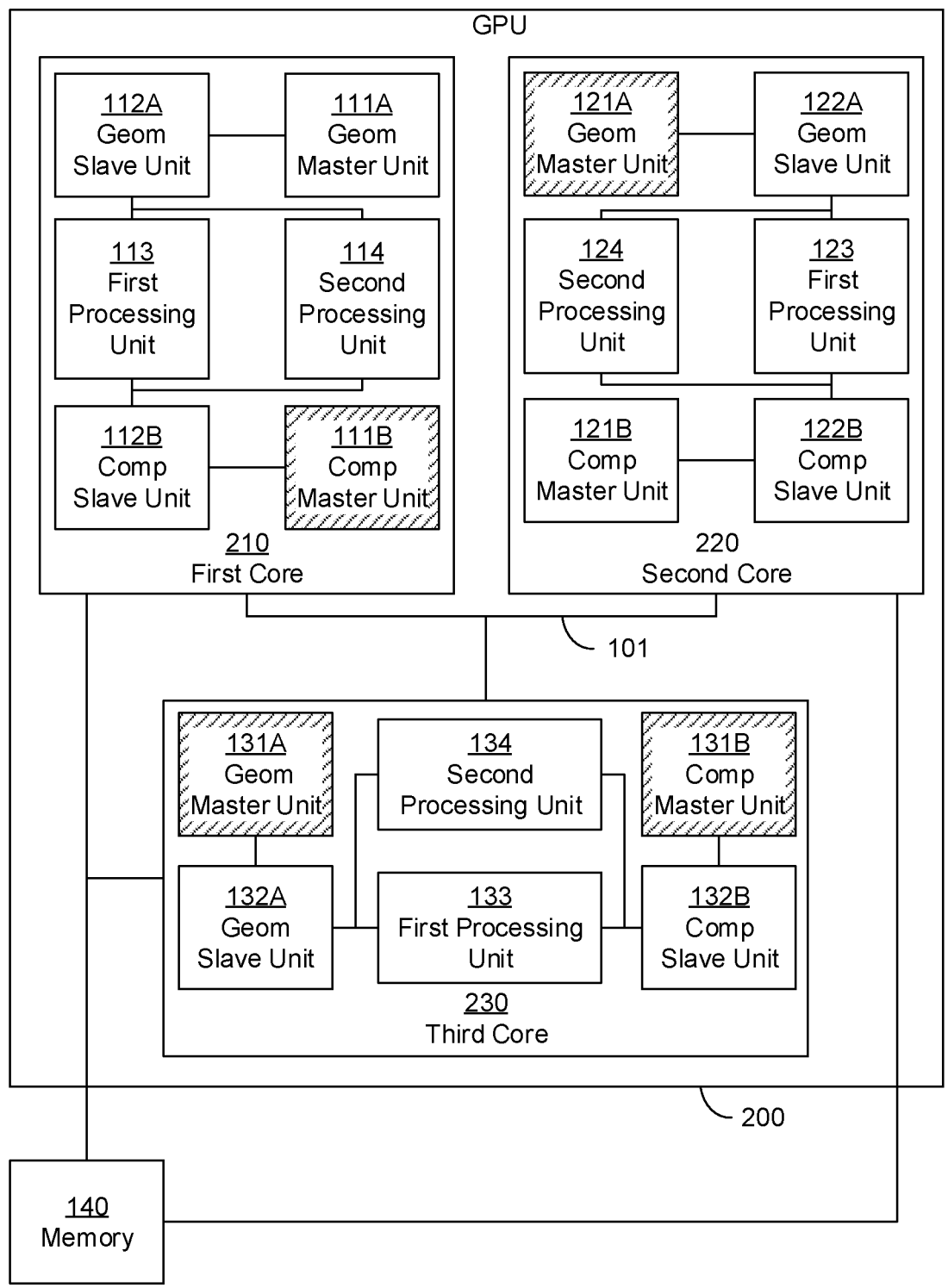
FIG. 2 is a block diagram of a GPU according to another example.

FIG. 2 depicts a GPU 200 comprising more than one type of master unit, and more than two cores. The GPU 200 can be thought of as an example of the GPU 100 of FIG. 1, in which some of the additional hardware mentioned above is shown. The GPU 200 comprises a first core 210, a second core 220, and a third core 230. The first core 210 comprises a geometry master unit 111A, a geometry slave unit 112A, a compute master unit 111B, a compute slave unit 112B, a first processing unit 113 and a second processing unit 114. The second core 220 comprises a geometry master unit 121A, a geometry slave unit 122A, a compute master unit 121B, a compute slave unit 122B, a first processing unit 123 and a second processing unit 124. The third core 230 comprises a geometry master unit 131A, a geometry slave unit 132A, a compute master unit 131B, a compute slave unit 132B, a first processing unit 133 and a second processing unit 134.

As explained above, a geometry master unit is a master unit that is configured to receive, from an application driver, geometry processing tasks and the state information required to process the geometry processing tasks. The geometry master unit is responsible for splitting the geometry processing tasks into subsets of tasks, assigning the subsets to cores within the GPU, and transmitting an indication of the subsets of tasks and elements of state information required to process those subsets to the cores to which they have been assigned. A geometry slave unit is a slave unit that is configured to receive from a geometry master unit an indication of a subset of geometry processing tasks and the elements of state information required to process that subset. The geometry slave unit of a core manages the execution of geometry processing tasks by the processing units of that core.

Similarly, a compute master unit is a master unit that is configured to receive compute processing tasks from the application driver, and to receive the state information required to process the compute tasks. The compute master unit is responsible for splitting the compute tasks into subsets of tasks, assigning the subsets to cores within the GPU, and transmitting an indication of the subsets of tasks, and elements of state information required to process those subsets, to the cores to which they have been assigned. A compute slave unit is a slave unit that is configured to receive from a compute master unit an indication of a subset of compute processing tasks and the elements of state information required to process that subset. The compute slave unit of a core manages the execution of compute tasks by the processing units of that core.

In the example of FIG. 2, the GPU 200 is configured to process geometry processing tasks and compute processing tasks. Consequently, the GPU 200 has two active master units—the geometry master unit 111A of the first core 210, and the compute master unit 121B of the second core 220. It should be understood that any geometry master unit, and any compute master unit, could be chosen to be the two active master units. All other master units in the GPU 200 are inactive, as represented by the hatching in FIG. 2. The geometry master unit 111A comprises a first cache (not shown in FIG. 2). The compute master unit 121B comprises a second cache (not shown in FIG. 2).

The geometry master unit 111A is configured to receive, from the application driver, geometry processing tasks and the state information required to process those tasks. The compute master unit 121B is configured to receive, from the application driver, compute tasks and the state information required to process those tasks. The geometry master unit 111A is configured to cache (store) the state information sent to it, in the first cache, and the compute master unit 121B is configured to cache (store) the state information sent to it, in the second cache. As with the active master unit 111 of FIG. 1, the geometry master unit 111A maintains a record of the elements of state information that it has sent to the cores, and the compute master unit 121B maintains a record of the elements of state information that it has sent to the cores.

In examples in which the GPU comprises more than two cores, such as the example of FIG. 2, the active geometry master unit 111A selects one or more of the cores of the GPU 200 to execute the geometry processing tasks. Similarly, the active compute master unit 121B selects one or more of the cores of the GPU 200 to execute the compute tasks. Each active master unit may select the same number of cores, or a different number of cores. Each active master unit may select the same cores, or different cores. Some of the cores may be selected by more than one active master unit. Of particular interest, when considering the management of state information, are the situations in which an active master unit selects two or more of the cores of the GPU 200 to execute tasks.

In the example of FIG. 2, let us assume that the active geometry master unit 111A selects the first core 210 and the second core 220 to execute the geometry processing tasks. It should be noted that, because the geometry master unit 111A does not select the third core 230 to execute the geometry processing tasks, the only elements of state information that the geometry master unit 111A sends to the third core 230 are cumulative elements of state information (since these are sent to all cores, according to the present implementation).

In the example of FIG. 2, the active compute master unit 121B selects the first core 210 and the third core 230 to execute the compute tasks (in other examples, the active compute master unit 121B may select a different combination of cores). Because the compute master unit 121B does not select the second core 220 to execute compute processing tasks, the only elements of state information that the compute master unit 121B sends to the second core 220 (more specifically, to the compute slave unit 122B) are cumulative elements of state information. The compute master unit 121B splits the set of compute tasks into at least a seventh subset of tasks and an eighth subset of tasks. The compute master unit 121B assigns the seventh subset of tasks to the first core 210 and assigns the eighth subset of tasks to the third core 230. The compute master unit 121B identifies the elements of the state information that are required to process the seventh subset of tasks (referred to herein as the seventh elements), and identifies the elements of state information that are required to process the eighth subset of tasks (referred to herein as the eighth elements). The compute master unit 121B transmits an indication of the seventh subset of tasks to the first core 210, and transmits an indication of the seventh elements to the first core 210. The compute master unit 121B transmits an indication of the eighth subset of tasks to the third core 230, and transmits an indication of the eighth elements to the third core 230.

As with the active master unit 111 of FIG. 1, the geometry master unit 111A updates its record after it has transmitted state information to any of the cores, and the compute master unit 121B updates its record after it has transmitted state information to any of the cores.

The compute master unit 121B may be configured to manage additional compute tasks and additional elements of associated state information in the same way as described above for the active master unit 111 of FIG. 1. The compute slave units of the GPU 200 may be configured in the same way as the slave unit 112 of the GPU 100 of FIG. 1. More generally, the operation of two active master units within a GPU may be substantially identical, apart from the fact that the active master units manage different types of task and state information, and may select different cores to execute those tasks.

An exemplary method 300 performed by the GPU 100 of FIG. 1 will now be explained with reference to FIG. 3.

In step 301, the active master unit 111 receives a set of image rendering tasks and state information required to process the image rendering tasks. The state information includes a cumulative element of state information. In step 302, the active master unit 111 stores the state information in cache 115. In step 303, the active master unit 111 transmits to the first core 110 and the second core 120 an indication of the cumulative element of the state information. In the present example, the active master unit 111 transmits the cumulative element of state information (and not an address in memory of the state information) to the core. However, in other examples, the active master unit 111 transmits the address in memory of the cumulative element of state information to the core.

In step 304, the active master unit 111 splits the set of image rendering tasks into a first subset of tasks and a second subset of tasks. In step 305, the active master unit 111 assigns the first subset of tasks to the first core 110. In step 306, the active master unit 111 assigns the second subset of tasks to the second core 120.

In step 307 the active master 111 unit identifies the first elements of state information. In step 308, the active master unit 111 identifies the second elements of state information. In one example, a core may require all of the elements of state information to process either one of the first subset of tasks and the second subset of tasks. Therefore, the active master unit 111 identifies all of the elements of state information as being both first elements and second elements of state information.

In step 309, the active master unit 111 transmits an indication of the first subset of tasks to the first core 110. In step 310, the active master unit 111 transmits an indication of the second subset of tasks to the second core 120. In step 311, the active master unit 111 transmits an indication of a portion of the state information to the first core 110. More specifically, in the present example, the active master unit 111 transmits the first elements to the slave unit 112 of the first core 110. In step 312, the active master unit 111 transmits an indication of a portion of the state information to the second core 120. More specifically, in the present example, the active master unit 111 transmits the second elements to the slave unit 122 of the second core 120. As explained previously, the active master unit 111 only sends to the first core the indication of the first elements of state information (the elements required by the first core to process the first subset of tasks), and only sends to the second core 120 the indication of the second elements (the elements required by the second core to process the second subset of tasks). In the example mentioned above, all of the indications of the elements of state information are sent to the first core 110 and the second core 120, because all of the elements of state information are identified as being required to process the first subset of tasks and the second subset of tasks.

In step 313, the active master unit 111 updates the record of the state information to reflect the fact that the first elements have been transmitted to the first core 110 and the second elements have been transmitted to the second core 120. In step 314A, the active master unit 111 receives additional state information. In step 314B, the active master unit 111 receives an additional set of geometry processing tasks. In the present example, the additional state information includes a new element of state information and an updated element of state information. The updated element of state information supersedes an existing element of state information that is stored in the cache 115 and represented in the record.

In step 315, the active master unit 111 stores the new element of state information in the cache 115. In step 316, the active master unit updates the record to include the new element of state information and to indicate that this element of state information has not been transmitted to any of the cores. In step 317, active master unit 111 stores the updated element of state information in the cache 115 by replacing the element of state information superseded by the updated element. In step 318, the active master unit 111 updates the record to indicate that the element of state information has not been transmitted to any of the cores.

In the present example, the updated element of state information is topology information. The topology information stored in the cache 115 is replaced by the updated topology information, and the record is updated to indicate that none of the cores has received the topology information.

Figure 3:
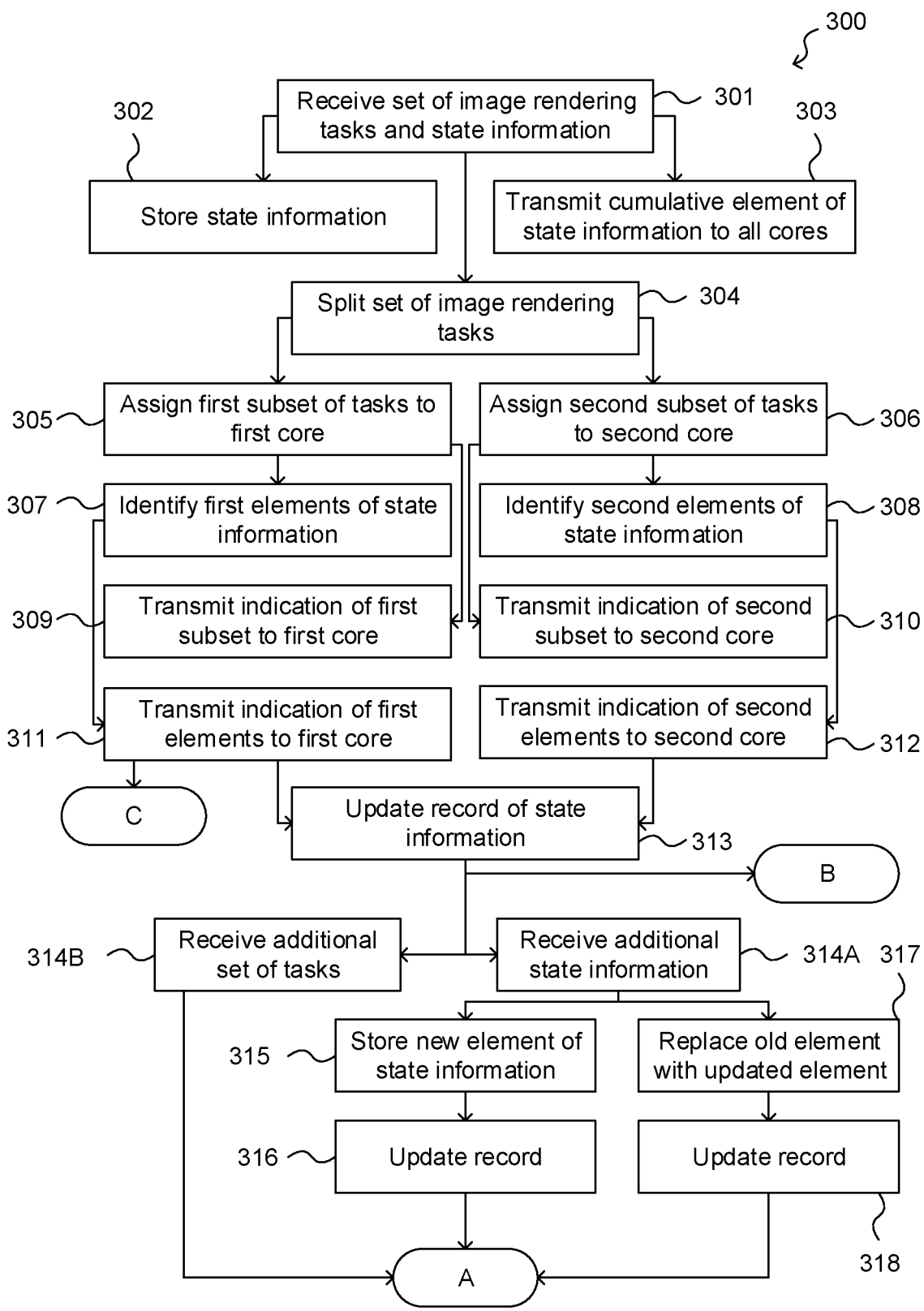
FIG. 3 is a flowchart illustrating a method according to an example.
Figure 4A:
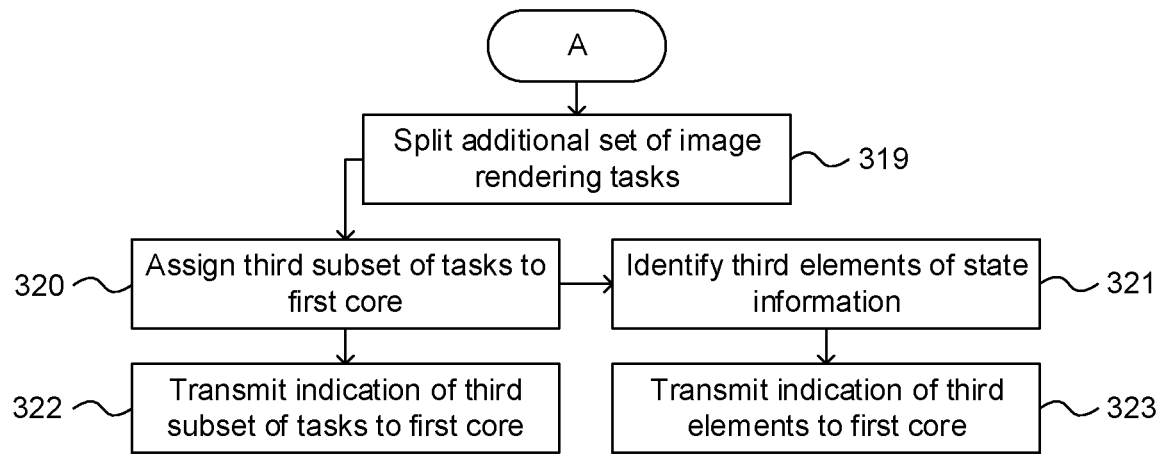
FIGS. 4A-4C are continuations of the flowchart of FIG. 3.

We now turn to FIG. 4A, which is a continuation of the method 300 of FIG. 3, continuing from steps 316 and 318. In step 319, the active master unit 111 splits the additional set of tasks into a third subset of tasks and a fourth subset of tasks. In step 320, the active master unit 111 assigns the third subset of tasks to the first core 110. In step 321, the active master unit 111 identifies the third elements of state information. As explained above, the third elements of state information are the elements of state information that are required to process the third subset of tasks and that have not yet been transmitted to the first core 110. The active master unit 111 identifies the third elements by comparing the elements of state information that are required to process the third subset of tasks with the record of the state information.

In step 322, the active master unit 111 transmits an indication of the third subset of tasks to the first core 110. In step 323, the active master unit 111 transmits an indication of the third elements of state information to the first core 110.

Figure 4B:
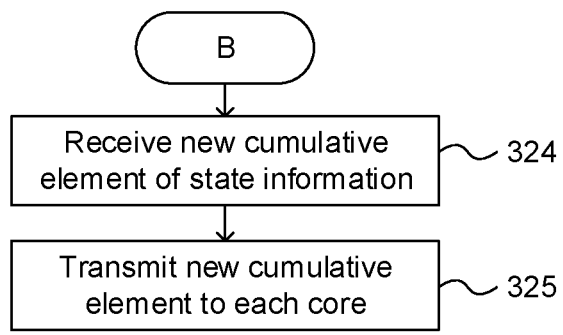

We now turn to FIG. 4B, which is also a continuation of the method 300 of FIG. 3, starting after step 313. In step 324, the active master unit 111 receives a new cumulative element of state information. In step 325, the active master unit 111 transmits an indication of the new cumulative element to each of the cores in the GPU 100.

Figure 4C:
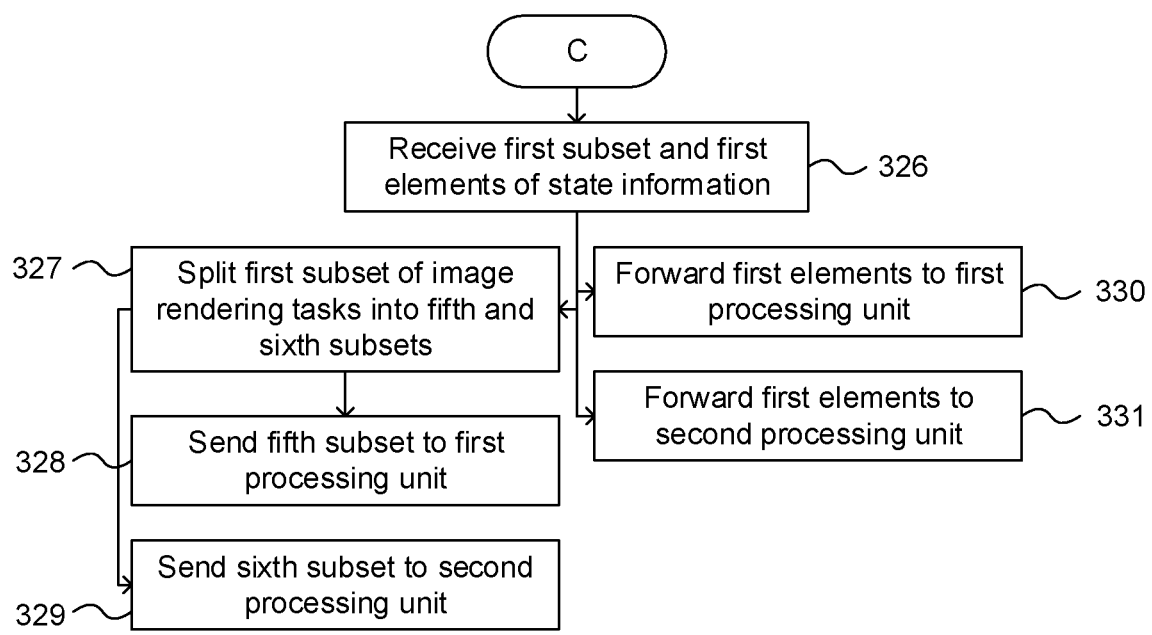

We now turn to FIG. 4C, which is also a continuation of the method 300 of FIG. 3, beginning from step 311. In step 326, slave unit 112 receives the indication of the first subset of tasks and the first elements of state information. Because the slave unit 112 and the active master unit 111 are in the same core, the indication of the first subset of tasks and the first elements of state information may be transmitted directly from the active master unit 111 to the slave unit 112 without leaving the core.

In step 327, the slave unit 112 splits the first subset of tasks into a fifth subset of tasks and a sixth subset of tasks. In step 328, the slave unit 112 sends the fifth subset of tasks to the first processing unit 113. In step 329, the slave unit 112 sends the sixth subset of tasks to the second processing unit 114. In step 330, the slave unit 112 forwards the first elements of state information to the first processing unit 113. In step 331, the slave unit 112 forwards the first elements of state information to the second processing unit 114. By forwarding the first elements in their entirety to both processing units 113, 114, the slave unit 112 ensures that each processing unit is able to process any of the tasks in the first set of tasks.

A similar method, having steps corresponding with steps 326-331, may be performed by the slave unit 122 of the second core. Because the slave unit 122 is not in the same core as the active master unit 111, the active master unit 111 transmits the indications over the register bus 101 that links the first core 110 and the second core 120. In some examples, the slave unit 122 may receive this data directly from the register bus. In other examples, another hardware unit (an interface unit) of the second core 120 may interface with the register bus and forward the data to the slave unit 122.

In examples in which a GPU comprises additional active master units (such as the example of FIG. 2), the additional active master units may carry out method steps corresponding to those described above for active master unit 111 (steps 301-325), but for different types of image rendering tasks. For example, the compute master unit 121B of GPU 200 may receive a set of compute tasks and state information required to process the compute tasks and split the set of compute tasks into a seventh subset of tasks and an eighth subset of tasks.

In some examples, multiple subsets of tasks contained in a set of image rendering tasks require the same elements of state information to be available, in order for those tasks to be processed. (Such elements of state information will be referred to in this example as "shared elements".) In these examples, once a core has received all of the shared elements, it is able to process any/all of the multiple subsets of tasks. Preferably, to reduce unnecessary data transmission over the register bus, the active master unit transmits an indication of the shared elements to the core only once. The active master unit can then transmit indications of some/all of the multiple subsets to the core without needing to transmit any further state information to the core. In other words, the active master unit can transmit one portion of state information to a core (once), but can transmit indications of multiple subsets of tasks to that core, which rely on that state information. In some examples, the active master unit may preferentially assign subsets of tasks to a core that the record shows already has the state information needed to process those subsets of tasks.

A special type of state information for geometry processing tasks is draw state. Draw state is universal for a set of geometry processing tasks, in that the elements of the draw state are required to process all of the geometry processing tasks (in a set of geometry processing tasks). In other words, a set of geometry processing tasks may contain many subsets of tasks, but it only has one draw state. The active geometry master unit transmits the draw state to each of the cores that have been assigned a subset of geometry processing tasks. Preferably, to avoid the redundant transmission of data between cores, the active geometry master unit transmits the draw state to a core only once for a set of tasks. If a core requires further elements of state information to process a particular subset of geometry processing tasks, the active master unit determines this using the record and transmits the further elements to the core, but it does not re-transmit the draw state to the core. In other words, the active geometry master unit may split a set of geometry processing tasks into many subsets of tasks, and may transmit many subsets of tasks to a core, but it will only transmit the draw state to a core once.

More generally, an active master unit preferably will not re-transmit to a core an element of state information that has already been sent to that core (as indicated by the record).

It should be understood that the scope of the present disclosure is not limited to the examples above. Many variations are possible, including but not limited to the following.

In the example of FIG. 1, the master unit 111 is a geometry processing master unit, configured to receive and distribute geometry processing tasks and geometry state information. However, in other examples the master unit 111 may instead be a master unit of another kind—for example, configured to receive and distribute compute tasks and compute type state information; or fragment tasks and fragment type state information, or any other kind of image rendering task and associated state information.

In the example of FIGS. 1 and 2, the active master unit(s) store state information in caches contained within said master unit(s). However, in other examples, an active master unit may store state information in a cache, or other memory device, external to the master unit. Where the cache is external to the master unit, it may still be within the same core as the master unit in question, or at least within the GPU. In some examples, the active master unit 111 may be configured to store the state information in the memory 140. In some examples, each master unit in the GPU may have its own cache, either contained within the master unit, or in the same core as that master unit.

In the example of FIG. 1, the active master unit 111 transmits the address in the memory 140 of the first subset of tasks to the first core, and transmits the first elements of state information to the first core. It should be understood that, in other examples, a different combination of indications may be used. Furthermore, where a GPU comprises multiple active master units of different types, two active master units may use different indications to transmit subsets of tasks and/or elements of state information to a core. For example, an active master unit may, when transmitting an indication of a subset of tasks (or an indication of elements of state information) to the core in which it resides (more specifically, to a slave unit of that core), transmit the subset of elements to the core. However, when the active master unit transmits an indication to a different core of the GPU, it may transmit an address in memory of the subset or elements in order to reduce the amount of data being sent over the register bus.

In the examples described above, an active master unit only transmits to a core the elements of state information that have been identified by the active master unit as being required to process the subset of tasks assigned to that core. In some examples, the active master unit may, in addition to the required elements of state information, transmit to a core additional elements of state information that are not required to process the tasks assigned to that core. However, apart from where a subset of tasks assigned to a core requires all of the state information, in order for that subset of tasks to be processed, it may be advantageous for the active master unit not to transmit all of the state information to a core. In other words, the active master unit transmits to a core at least the portion of the state information required to process the subset of tasks assigned to that core but, where possible, avoids transmitting all of the state information. More generally, when sending state information to a core, the active master unit may transmit some, but not all of, the elements of state information to that core.

In some examples, an element of state information is required by more than one core. Consequently, the first elements of state information and the second elements of state information can contain some of the same elements.

In the examples described above, the additional state information received by an active master unit includes both a new element of state information and an updated element of state information. However, in some examples, the additional state information may include only new elements of state information or only updated elements of state information.

In the example of FIG. 1, the active master unit 111 is configured to assign and transmit the third subset of tasks and the third elements to the first core 110. In some examples, the active master unit 111 may instead assign the third subset of tasks to the second core (or to any other core present in the GPU, where the GPU contains more than two cores). In this case, the determination of the third elements is based on which elements have previously been transmitted to the second (or other) core. More generally, it should be understood that the first/second/third etc. elements of state information are only identified after the corresponding subset of tasks has been assigned to a core, and the identification of the elements is based on which elements of state information have already been transmitted to the core to which the subset is assigned.

The active master unit 111 may assign the fourth subset of tasks to any of the cores of the GPU 100. The active master unit 111 may identify fourth elements of state information in the same way that the third elements were identified. The active master unit 111 may transmit to the core to which the fourth subset is assigned an indication of the fourth elements and an indication of the fourth subset of tasks. In some examples, the active master unit 111 may assign the third and fourth subsets to the same core.

In some examples, each core of the GPU comprises an interface unit in communication with the master unit(s) and the slave unit(s) of the core, as well as the register bus 101. The interface unit of a core is configured to forward communications from a master unit in said core to the register bus, and is configured to forward communications from the register bus to a slave unit of the core. In other examples, the master unit(s) and the slave unit(s) of a core interface directly with the register bus.

In the example of FIG. 1, the first core 110 and the second core 120 each comprise a single master unit and a single slave unit. However, in some examples, each core of the GPU may comprise two or more master units, and a corresponding number of slave units. Although a core may comprise multiple master units, each master unit within a core may be configured to receive and parse a different type of image rendering task. For example, a core will normally not contain multiple geometry master units or multiple compute master units. In some examples, some (but not all) of the cores of the GPU might not include a master unit. For example, the second core 120 of the GPU 100 might, in some examples, not include the master unit 121. More generally, any master units that are inactive in a GPU may instead simply not be present in the GPU.

In the examples of FIGS. 1 and 2, each core comprises two processing units. However, in some examples, each core might contain only one processing unit, or might contain more than two processing units. In some examples, the first and second cores might comprise different numbers of processing units.

In the example of FIG. 2, each core 210, 220, 230 of the GPU 200 comprises a geometry master and geometry slave unit, as well as a compute master and compute slave unit. However, in some examples, each core may comprise master units and slave units configured to manage types of image rendering task (or combinations of types) that are different to those discussed for FIG. 2. For example, each core may comprise a fragment master unit and a fragment slave unit, as well as a geometry master unit and a geometry slave unit.

In the example of FIG. 2, the two active master units 111A, 121B reside in different cores. However, in some examples, a single core may comprise both/all of the active master units.

In the example of FIG. 2, the geometry master unit 111A selects the first core 210 and the second core 220 to execute the geometry processing tasks. The compute master unit 121B selects the first core 210 and the third core 230 to execute the compute tasks. However, other selections can be made. Each active master unit in the GPU 200 may select any one or more of the cores of the GPU 200 to execute image rendering tasks. The number of cores that a master unit selects, and which cores it selects, may depend on a number of different factors. For example, an active master unit that receives a set of image rendering tasks containing a large number of tasks may select more cores to process those tasks than an active master unit that receives a set of image rendering tasks containing a smaller number of tasks. Another factor that may impact the selection of cores is load balancing. Active master units may preferentially select idle cores, or cores that are furthest from being at full capacity, instead of selecting busier cores that are closer to full capacity. In some examples, a core may be temporarily reserved to process only one type of image rendering task, for example, geometry processing tasks. The active geometry master unit of the GPU may preferentially assign subsets of tasks to this reserved core, while all other active master units might avoid assigning subsets of tasks to that core.

In the examples described above, an active master unit splits a set of tasks into a first subset and a second subset of tasks. More generally, an active master unit can split a set of tasks into two or more subsets of tasks.

In the example of FIG. 3, the method 300 is depicted as having various paths. One example of this is the three paths that extend from step 301. The method 300 splits three ways into step 302, step 303, and step 304. It should be understood that this splitting does not mean that these three paths are three alternative steps. Instead, it is intended to show that there is no particular chronological relationship between each different path, in that no one step needs to precede (or follow) the other two. For example, step 302 may occur before or after step 304. All three steps may be performed at the same time, or in any order. This is true in general for all of the paths depicted in FIG. 3, unless otherwise stated explicitly. Another example of this is steps 305 and 306, which both extend from step 304 on separate paths. This is intended to show that while both steps 305 and 306 are performed, they may be performed in any order, including simultaneously.

It should be understood that method steps 303, 307-308, and steps 313-331 are optional. In some examples, some or all of these steps may be omitted.

In the example of FIG. 4A, the third subset of tasks was assigned to the first core 110. However, in other examples, the third subset of tasks may be assigned to a different core. In other words, the third subset of tasks may be assigned to any core of the GPU. It should be understood that, while not depicted in FIG. 4A, the active master unit 111 can perform method steps corresponding to steps 320-323 for the fourth subset of tasks. The active master unit 111 may assign and transmit the fourth subset of tasks to the same core as it did for the third subset of tasks, or to a different core.

In the examples described above, the cores are linked by a register bus 101. However, in other examples, the cores may be linked by other communications means, such as by an XPU bus. The XPU bus may use the industry standard AXI protocol. In some examples, the cores may be connected with dedicated connections for carrying communications between the cores. As is explained above, in some examples, when an active master unit transmits an indication of a subset of tasks and an indication of elements of state information to a slave unit in the core in which the active master unit resides, the active master unit may transmit that information directly to the slave unit and not via the register bus 101 (or other communications means that links the cores). In such examples, active master units may preferentially assign subsets of tasks to the cores in which they reside. This is because transmitting information within a core does not contribute to competition for use of the register bus.

The examples described above and depicted in the Figures relate to examples in which the GPU comprises two or three cores. However, it should be understood that the present disclosure can be applied to a GPU comprising more than three cores. For example, a GPU may comprise four cores.

In the examples described above, the cores of the GPU are designed and instantiated as identical components. This is more convenient from the perspectives of design and validation, and facilitates scalability. However, this need not necessarily be the case. In some examples, the cores may differ in that the inactive master units might not be present in the GPU. In other words, only the core(s) comprising an active master unit comprise any master unit at all.

While the examples above have largely focused on the first core 110, it should be understood that the features described for the first core 110 can be generalised to apply to any core in the GPU. For example, the method of FIG. 4C may be applied to the slave unit 122 of the second core 120 for the management of the second subset of tasks and second elements of state information.

In the example of FIG. 1, the first core 110 comprises the active master unit 111. However, in other examples, the master unit 111 of the first core 110 may be inactive, and the master unit 121 of the second core 120 may be active. It should be noted that, where there are at least three cores in the GPU, the active master unit might or might not assign a subset of tasks to the core in which it resides.

Figure 5:
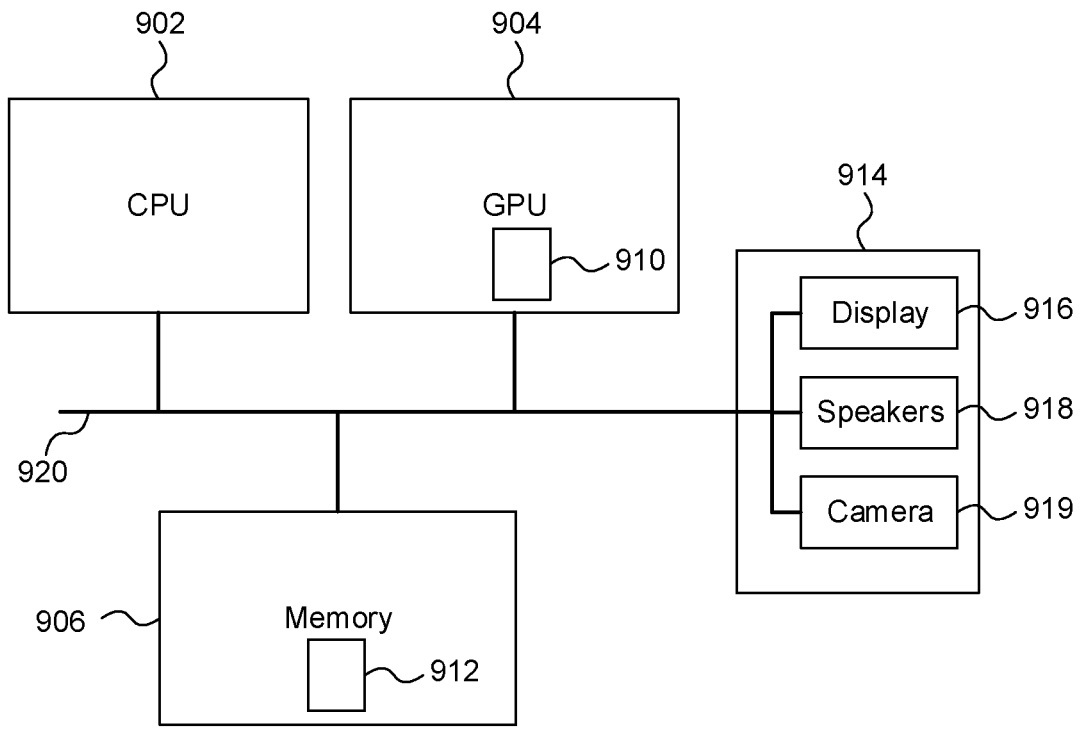
FIG. 5 shows a computer system in which a graphics processing system is implemented.

FIG. 5 shows a computer system in which the graphics processing systems described herein may be implemented. The computer system comprises a CPU 902, a GPU 904, a memory 906 and other devices 914, such as a display 916, speakers 918 and a camera 919. A processing block 910 (corresponding to cores 110, 120, or 210, 220, 230, and register bus 101) is implemented on the GPU 904. In other examples, the processing block 910 may be implemented on the CPU 902. The components of the computer system can communicate with each other via a communications bus 920. A store 912 (corresponding to memory 140) is implemented as part of the memory 906.

The GPUs of FIGS. 1-2 are shown as comprising a number of functional blocks. This is schematic only and is not intended to define a strict division between different logic elements of such entities. Each functional block may be provided in any suitable manner. It is to be understood that intermediate values described herein as being formed by a GPU need not be physically generated by the GPU at any point and may merely represent logical values which conveniently describe the processing performed by the GPU between its input and output.

The GPUs described herein may be embodied in hardware on an integrated circuit. The GPUs described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java® or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a GPU or graphics processing system configured to perform any of the methods described herein, or to manufacture a GPU or graphics processing system comprising any apparatus described herein. An integrated circuit definition dataset may be, for example, an integrated circuit description.

Therefore, there may be provided a method of manufacturing, at an integrated circuit manufacturing system, a GPU or graphics processing system as described herein. Furthermore, there may be provided an integrated circuit definition dataset that, when processed in an integrated circuit manufacturing system, causes the method of manufacturing a GPU or graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a GPU or graphics processing system will now be described with respect to FIG. 6.

Figure 6:
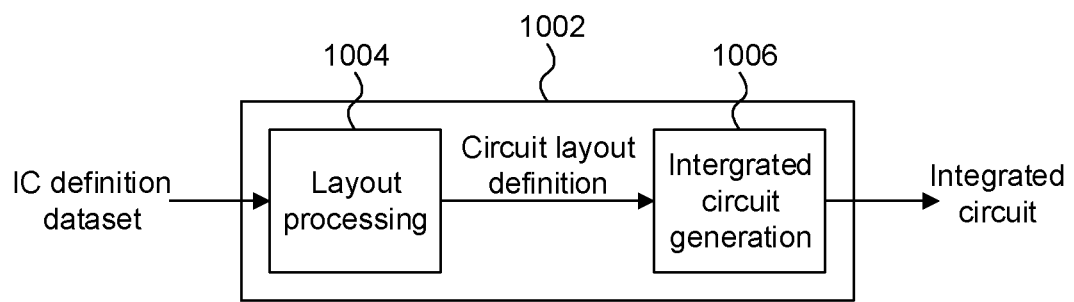
FIG. 6 shows an integrated circuit manufacturing system for generating an integrated circuit embodying a graphics processing system.

FIG. 6 shows an example of an integrated circuit (IC) manufacturing system 1002 which is configured to manufacture a GPU or graphics processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a GPU or graphics processing system as described in any of the examples herein), process the IC definition dataset, and generate an IC according to the IC definition dataset (e.g. which embodies a GPU or graphics processing system as described in any of the examples herein). The processing of the IC definition dataset configures the IC manufacturing system 1002 to manufacture an integrated circuit embodying a GPU or graphics processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a GPU or graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing unit comprising a plurality of cores, wherein one of the plurality of cores comprises a first master unit configured to:
receive a set of image rendering tasks and state information, wherein the state information comprises elements of state information required for processing the image rendering tasks;
store the state information in a memory;
split the set of image rendering tasks into at least a first subset of tasks and a second subset of tasks;
assign the first subset of tasks to a first core of the plurality of cores;
assign the second subset of tasks to a second core of the plurality of cores;
transmit an indication of at least a first portion of the state information to the first core;
transmit an indication of at least a second portion of the state information to the second core;
transmit an indication of the first subset of tasks to the first core;
transmit an indication of the second subset of tasks to the second core; and
wherein each core of the plurality of cores comprises a slave unit configured to perform image rendering tasks.

2. The graphics processing unit of claim 1, wherein the first master unit is further configured to:
identify first elements of the state information that are required for processing the first subset of tasks; and
identify second elements of the state information that are required for processing the second subset of tasks;
wherein the first portion of the of the state information consists of the first elements of the state information, and the second portion of the state information consists of the second elements of the state information.

3. The graphics processing unit of claim 2, wherein the first master unit is configured to:
not transmit to the first core any elements of state information other than the first elements of state information; and
not transmit to the second core any elements of state information other than the second elements of state information.

4. The graphics processing unit of claim 1, wherein the first master unit is configured to maintain a record of the cores to which each element of state information has been transmitted, and to update the record each time an element of state information is transmitted to one of the cores.

5. The graphics processing unit of claim 1, wherein one of the plurality of cores comprises a second master unit configured to:
receive a second set of image rendering tasks and second state information, wherein the second state information comprises elements of second state information required for processing the second set of image rendering tasks;
store the second state information in a second memory;
split the second set of image rendering tasks into at least a fifth subset of tasks and a sixth subset of tasks;
assign the fifth subset of tasks to the first core;
transmit an indication of at least a portion of the second state information to the first core; and
transmit the fifth subset of tasks to the first core.

6. The graphics processing unit of claim 1, wherein:
the plurality of cores are connected by a register bus configured to communicate register write commands between the cores;
the first master unit is configured to output at least a first register write command and a second register write command;
the first register write command is addressed to the first core and comprises an indication of the elements of state information required to process the first subset of tasks; and
the second register write command is addressed to the second core and comprises an indication of the elements of state information required to process the second subset of tasks.

7. The graphics processing unit of claim 1, wherein the first core comprises a plurality of processing units configured to process image rendering tasks, and wherein the slave unit of the first core is configured to:
receive the first subset of the image rendering tasks and the first portion of the state information;
split the first subset of image rendering tasks into a seventh subset of tasks and an eighth subset of tasks;
send the seventh subset to a first processing unit;
send the eighth subset to a second processing unit;
forward the first portion of the state information to the first processing unit; and
forward the first portion of the state information to the second processing unit.

8. A method of distributing a set of image rendering tasks and state information in a graphics processing unit comprising a plurality of cores, the method comprising:
receiving, by a first master unit in one of the plurality of cores, the set of image rendering tasks and the state information, wherein the state information comprises elements of state information required for processing the image rendering tasks;
storing, by the first master unit, the state information in a memory;
splitting, by the first master unit, the set of image rendering tasks into at least a first subset of tasks and a second subset of tasks;
assigning, by the master unit, the first subset of tasks to the first core;
assigning, by the master unit, the second subset of tasks to the second core;
transmitting, by the master unit to the first core, at least a first portion of the state information;
transmitting, by the master unit to the second core; at least a second portion of the state information;
transmitting, by the master unit to the first core, the first subset of tasks; and
transmitting, by the master unit to the second core, the second subset of tasks.

9. The method of claim 8, further comprising:
identifying, by the first master unit, first elements of state information that are required for processing the first subset of tasks; and
identifying, by the first master unit, second elements of state information that are required for processing the second subset of tasks;
wherein the first portion of the state information consists of the first elements of the state information, and the second portion of the state information consists of the second elements of the state information.

10. The method of claim 9, wherein the first master unit:
does not transmit to the first core any elements of state information other than the first elements of state information; and
does not transmit to the second core, any elements of state information other than the second elements of state information.

11. The method of claim 8, further comprising:
maintaining, by the first master unit, a record of the cores to which each element of state information has been transmitted; and
updating, by the first master unit, the record each time an element of state information is transmitted to one of the cores.

12. The method of claim 11, further comprising:
receiving, by the first master unit, additional state information, wherein the additional state information comprises one or more of:
 (A) a new element of state information, wherein the method further comprises:
  storing, by the master unit, the new element of state information, and
  updating, by the master unit, the record to include the new element of state information and indicate that the new element has not been transmitted to any of the cores, or
 (B) an updated element of state information, wherein the method further comprises:
  replacing, by the master unit, an element of state information stored in the memory with the updated element of state information, and
  updating, by the master unit, the record to indicate that the updated element has not been transmitted to any of the cores;
receiving, by the first master unit, an additional set of image rendering tasks associated with the additional state information;
splitting, by the first master unit, the additional set of image rendering tasks into at least a third subset of tasks and a fourth subset of tasks;
assigning, by the first master unit, the third subset of tasks to the first core;
identifying, based on the record, third elements of state information, wherein the third elements of state information are elements of state information that are required to process the third subset of tasks and have not been transmitted to the first core;
transmitting, by the first master unit and to the first core, an indication of the third elements of state information; and
transmitting, by the first master unit, an indication of the third subset of tasks to the first core.

13. The method of claim 8, wherein:
the state information includes a cumulative element of state information; and
the method further comprises transmitting, by the first master unit, the cumulative element of state information to every core in the graphics processing unit.

14. The method of claim 13, further comprising:
receiving, by the first master unit, a new cumulative element of state information; and
transmitting, by the first master unit, the new cumulative element of state information to each core in the plurality of cores.

15. The method of claim 8, further comprising:
receiving, by a slave unit of the first core, the first subset of tasks and the first portion of the state information;
splitting, by the slave unit, the first subset of tasks into a fifth subset of tasks and a sixth subset of tasks;
sending, by the slave unit; the fifth subset of tasks to a first processing unit of the first core;
sending, by the slave unit; the sixth subset of tasks to a second processing unit of the first core;
forwarding, by the slave unit to the first processing unit, the first portion of the state information; and
forwarding, by the slave unit to the second processing unit, the first portion of the state information.

16. The method of claim 8, further comprising:
receiving, by a second master unit in one of the plurality of cores, a second set of image rendering tasks and second state information, wherein the second state information comprises elements of second state information required for processing the second set of image rendering tasks;
storing, by the second master unit, the second state information in a second memory;
splitting, by the second master unit, the second set of image rendering tasks into at least a seventh subset of tasks and an eighth subset of tasks;
assigning, by the second master unit, the seventh subset of tasks to the first core;
transmitting, by the second master unit to the first core, at least a portion of the second state information; and
transmitting, by the second master unit, the seventh subset of tasks to the first core.

17. A method of manufacturing a graphics processing unit as set forth in claim 1, the method comprising inputting to an integrated circuit manufacturing system an integrated circuit definition dataset that, when processed in said integrated circuit manufacturing system, configures the integrated circuit manufacturing system to manufacture said graphics processing unit.

18. A non-transitory computer readable storage medium having stored thereon computer readable code configured to cause the method as set forth in claim 8 to be performed when the code is run.

19. A non-transitory computer readable storage medium having stored thereon a computer readable dataset description of a graphics processing unit as set forth in claim 1 that, when processed in an integrated circuit manufacturing system, causes the integrated circuit manufacturing system to manufacture an integrated circuit embodying the graphics processing unit.

20. An integrated circuit manufacturing system comprising:
a non-transitory computer readable storage medium having stored thereon a computer readable dataset description of a graphics processing unit as set forth in claim 1;
a layout processing system configured to process the computer readable dataset description so as to generate a circuit layout description of an integrated circuit embodying the graphics processing unit; and
an integrated circuit generation system configured to manufacture the graphics processing unit according to the circuit layout description.

* * * * *